United States Patent
Waki et al.

(10) Patent No.: US 9,376,323 B2
(45) Date of Patent: Jun. 28, 2016

(54) METHOD FOR PRODUCING TETRAFLUOROBORATE

(75) Inventors: Masahide Waki, Izumiotsu (JP);
Kazuhiro Miyamoto, Izumiotsu (JP);
Kazutaka Hirano, Izumiotsu (JP)

(73) Assignee: STELLA CHEMIFA CORPORATION, Osaka-Shi (JP)

( * ) Notice: Subject to any disclaimer, the term of this patent is extended or adjusted under 35 U.S.C. 154(b) by 1170 days.

(21) Appl. No.: 13/377,795

(22) PCT Filed: Jun. 19, 2009

(86) PCT No.: PCT/JP2009/061216
§ 371 (c)(1),
(2), (4) Date: Dec. 12, 2011

(87) PCT Pub. No.: WO2010/146710
PCT Pub. Date: Dec. 23, 2010

(65) Prior Publication Data
US 2012/0082608 A1   Apr. 5, 2012

(51) Int. Cl.
C01B 35/06   (2006.01)
H01M 10/0525   (2010.01)
H01M 10/0568   (2010.01)

(52) U.S. Cl.
CPC ............ C01B 35/063 (2013.01); C01B 35/066 (2013.01); H01M 10/0525 (2013.01); H01M 10/0568 (2013.01); Y02E 60/122 (2013.01); Y02P 70/54 (2015.11)

(58) Field of Classification Search
CPC ............... C01B 35/063; C01B 35/066; H01M 10/0568; H01M 10/0525; Y02E 60/122; Y02P 70/54
USPC ................................................ 423/276, 293
See application file for complete search history.

(56) References Cited

U.S. PATENT DOCUMENTS 3,978,140 A * 8/1976 Lane et al. .................... 568/705
6,537,512 B1   3/2003 Friedrich et al.
(Continued)

FOREIGN PATENT DOCUMENTS

JP   56145113 A * 11/1981
JP   S56-145113 A   11/1981
(Continued)

OTHER PUBLICATIONS

A Notification of Examination Opinions with Search Report issued by Taiwan Intellectual Property Office, mailed Apr. 28, 2014, for Taiwan counterpart application No. 098121190.
(Continued)

*Primary Examiner* — Ngoc-Yen Nguyen
(74) *Attorney, Agent, or Firm* — Law Office of Katsuhiro Arai

(57) ABSTRACT

An object of the invention is to provide a tetrafluoroborate producing method that allows high-yield, high-efficiency production of a tetrafluoroborate by a continuous process, a tetrafluoroborate-containing electrolyte, and an electrical storage device including such an electrolyte. The invention provides a method for producing a tetrafluoroborate, which includes: a first step including dissolving boron trifluoride gas in an organic solvent; a second step including adding, to the organic solvent, a fluoride ($MF_n$, wherein M represents a metal or $NH_4$, and $1 \leq n \leq 3$) in an amount stoichiometrically equivalent to or less than the amount of the boron trifluoride so that a tetrafluoroborate solution is produced; and a third step including circulating the tetrafluoroborate solution through the first step so that the boron trifluoride gas is dissolved in the tetrafluoroborate solution instead of the organic solvent.

7 Claims, 2 Drawing Sheets

(56) References Cited

U.S. PATENT DOCUMENTS

| | | |
|---|---|---|
| 8,501,138 B2 | 8/2013 | Kikuyama et al. |
| 2007/0003466 A1 | 1/2007 | Oka |
| 2014/0162144 A1* | 6/2014 | Shinmen et al. ............. 429/342 |

FOREIGN PATENT DOCUMENTS

| | | |
|---|---|---|
| JP | H11-157830 A1 | 6/1999 |
| JP | 2000-016995 A | 1/2000 |
| JP | 2001-247307 A1 | 9/2001 |
| JP | 2002-538062 A | 11/2002 |
| JP | 2006342021 A | 12/2006 |
| JP | 2009-155130 A1 | 7/2009 |
| KR | 1020060107738 A | 10/2006 |

OTHER PUBLICATIONS

Extended European Search Report (EESR) dated Oct. 17, 2014, issued for corresponding European patent application No. EP09846203.9.

An Office Action issued by Korean Intellectual Property Office, mailed Jul. 14, 2015, for Korean counterpart application No. 1020127001546.

* cited by examiner

METHOD FOR PRODUCING TETRAFLUOROBORATE

This application is the U.S. National Phase under 35 U.S.C. §371 of International Application PCT/JP2009/061216, filed Jun. 19, 2009. The International Application was published under PCT Article 21(2) in a language other than English.

TECHNICAL FIELD

The invention relates to a method and an apparatus for producing a tetrafluoroborate, and more specifically to a method for producing a tetrafluoroborate suitable for use in an electrolyte for electrical storage devices, an electrolyte containing such a tetrafluoroborate, and an electrical storage device including such an electrolyte.

BACKGROUND ART

For example, a conventional method for producing a tetrafluoroborate includes a method for producing lithium tetrafluoroborate, which typically includes allowing lithium carbonate to react with a fluoroboric acid solution to obtain lithium tetrafluoroborate. In this method, the resulting salt is lithium fluoroborate monohydrate, which is represented by the formula $LiBF_4 \cdot H_2O$, and therefore, dehydration by heating at about 200° C. is necessary. Unfortunately, heating at about 200° C. can decompose lithium tetrafluoroborate and therefore may reduce its purity. In addition, several thousand ppmw of water also remains. Therefore, this production method is not necessarily satisfactory in view of the controllability of the reaction and the purity of the resulting product and so on.

To solve this problem, for example, Patent Document 1 listed below discloses a method of producing lithium tetrafluoroborate by a process including blowing boron trifluoride gas into a lithium fluoride-containing, non-aqueous, organic solvent for a lithium secondary battery electrolyte to allow the lithium fluoride to react with the boron trifluoride.

In the above production method, however, the organic solvent forms a suspension (slurry) because lithium fluoride has low solubility in the organic solvent. In the production process, therefore, it is difficult to circulate the lithium fluoride-containing organic solvent, which causes a problem in which it is difficult to produce a tetrafluoroborate by a continuous process.

PRIOR ART DOCUMENTS

Patent Documents

Patent Document 1: Japanese Patent Application Laid-Open (JP-A) No. 11-157830

DISCLOSURE OF THE INVENTION

Problems to be Solved by the Invention

The invention has been made in view of the above problems, and an object of the invention is to provide a tetrafluoroborate producing method that allows high-yield, high-efficiency production of a tetrafluoroborate by a continuous process, a tetrafluoroborate-containing electrolyte, and an electrical storage device including such an electrolyte.

Means for Solving the Problems

To solve the conventional problems, the inventors have made studies on tetrafluoroborate producing methods, tetrafluoroborate-containing electrolytes, and electrical storage devices including such electrolytes. As a result, the inventors have accomplished the invention based on the finding that the object can be achieved using the features described below.

To solve the above problems, therefore, the invention provides a method for producing a tetrafluoroborate, which includes: a first step including dissolving boron trifluoride gas in an organic solvent; a second step including adding, to the organic solvent, a fluoride ($MF_n$, wherein M represents a metal or $NH_4$, and $1 \leq n \leq 3$) in an amount stoichiometrically equivalent to or less than the amount of the boron trifluoride so that a tetrafluoroborate solution is produced; and a third step including circulating the tetrafluoroborate solution through the first step so that the boron trifluoride gas is dissolved in the tetrafluoroborate solution instead of the organic solvent.

In general, fluorides are hardly soluble in organic solvents. Therefore, if a fluoride is added to an organic solvent before boron trifluoride gas is absorbed into the organic solvent, a suspension (slurry) will be formed. Therefore, a solid fluoride will cause clogging inside the apparatus during the absorption of boron trifluoride, which will interfere with the operation. In the method stated above, however, the first step in which boron trifluoride gas is first absorbed into the organic solvent is followed by the second step in which a fluoride is added to the organic solvent. Therefore, a tetrafluoroborate is synthesized in the organic solvent according to the chemical formula shown below. In addition, the fluoride is added in an amount stoichiometrically equivalent to or less than the amount of the boron trifluoride, and therefore, the entire amount of the fluoride reacts with the boron trifluoride. As a result, a tetrafluoroborate solution with no remaining unreacted fluoride is obtained in a non-slurry state. Therefore, the tetrafluoroborate solution can be circulated through the first step so that boron fluoride gas can be dissolved in the tetrafluoroborate solution instead of the organic solvent (the third step). Therefore, the above method makes it possible to use various apparatuses including absorption towers and to perform continuous operation so that tetrafluoroborate productivity can be improved.

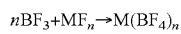

$$nBF_3 + MF_n \rightarrow M(BF_4)_n$$

(wherein M represents Li, Na, K, Rb, Cs, $NH_4$, or Ag when n=1, represents Ca, Mg, Ba, Zn, Cu, or Pb when n=2, or represents Al or Fe when n=3.)

The organic solvent is preferably a non-aqueous organic solvent or a non-aqueous ionic liquid. According to this feature, boron trifluoride can be absorbed without hydrolysis of the boron trifluoride or the tetrafluoroborate and without production of a hydrate of boron trifluoride or tetrafluoroborate as a by-product. If boron trifluoride or tetrafluoroborate is hydrolyzed, acidic substances such as oxyfluoroboric acid or hydrofluoric acid and boric acid or organic-solvent-insoluble components such as an oxyfluoroborate and a borate will be produced. If an electrolyte containing such acidic substances or insoluble components is used in an electrical storage device, they will have adverse effects such as corrosion of the electrical storage device and degradation of the electrical properties. Therefore, the organic solvent used preferably has low water content. From this point of view, the water content of the organic solvent is preferably 100 ppmw or less, more preferably 10 ppmw or less, in particular, preferably 1 ppmw or less.

The first step and the third step may be performed using an absorption tower. In the production method of the invention, formation of a suspension (slurry) state is prevented, because the fluoride is added after boron trifluoride gas is dissolved in the organic solvent and the tetrafluoroborate solution. Therefore, even when an absorption tower is used in the first step and the third step, clogging is prevented inside the absorption tower, which makes continuous operation possible. As a result, tetrafluoroborate productivity can be improved.

To solve the above problems, the invention also provides an electrolyte including the tetrafluoroborate obtained by the tetrafluoroborate producing method stated above.

To solve the above problems, the invention also provides an electrical storage device including the electrolyte stated above. The electrical storage device of the invention may be a lithium ion secondary battery or the like.

Effects of the Invention

By the means described above, the invention brings about advantageous effects as described below.

Specifically, according to the invention, boron trifluoride gas can be previously dissolved in an organic solvent in an absorption tower, and in the reaction tank, a fluoride can be added in an amount stoichiometrically equivalent to or less than the amount of the boron trifluoride, when they are allowed to react, so that a tetrafluoroborate solution with no remaining fluoride can be obtained. The resulting tetrafluoroborate solution can be supplied to the absorption tower again and circulated, so that the fluoride can be allowed to react with boron trifluoride in the reaction tank after the boron trifluoride gas is dissolved in the tetrafluoroborate solution. According to the invention, therefore, the tetrafluoroborate solution is circulated, so that a high-purity tetrafluoroborate with no unreacted fluoride or impurity can be produced by a continuous production process. In addition, a filtration step for removing the fluoride can be omitted, which is economically advantageous.

EMBODIMENTS FOR CARRYING OUT THE INVENTION

Figure 1:
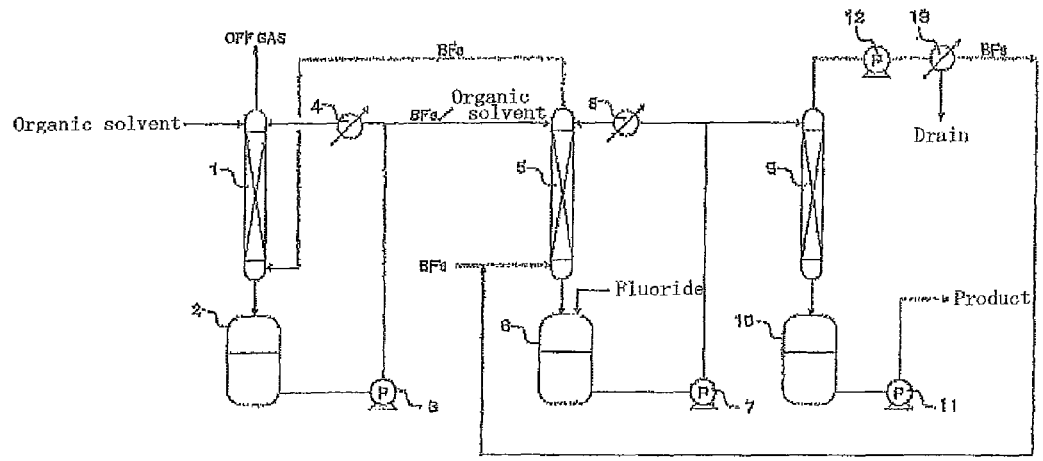
FIG. 1 is an explanatory diagram schematically showing a tetrafluoroborate producing apparatus according to an embodiment of the invention, Example 1, and Comparative Example 1.

Embodiments of the invention are described below with reference to FIG. 1. FIG. 1 is an explanatory diagram schematically showing a tetrafluoroborate producing apparatus according to an embodiment of the invention. It should be noted that some parts unnecessary for explanation are omitted, and some parts are illustrated in an enlarged, reduced or modified form for easy understanding.

As shown in FIG. 1, the production apparatus according to an embodiment of the invention includes a first absorption tower 1, a second absorption tower 5, a first tank 2, a second tank 6, a third tank 10, pumps 3, 7, and 11, a first cooler 4, a second cooler 8, a degassing tower 9, an air pump 12, and a condenser 13.

A given amount of an organic solvent is added to the first tank 2 and the second tank 6. The pumps 3 and 7 are used to supply the liquid from the first tank 2 and the second tank 6 to the first absorption tower 1 and the second absorption tower 5, respectively, and to perform circulation. Boron trifluoride (BF$_3$) gas is then supplied to the bottom of the second absorption tower 5. Gas of 100% boron trifluoride may be used, or appropriately diluted gas obtained by mixing boron trifluoride and inert gas may also be used. When inert gas is mixed, generation of heat in the first absorption tower 1 and the second absorption tower 5 can be reduced. Inert gas is not restricted, and for example, N$_2$, Ar, dry air, carbon dioxide gas, or any other inert gas may be used. The water content of the inert gas to be used for dilution is preferably as low as 100 ppmw or less, more preferably 10 ppmw or less, in particular, preferably 1 ppmw or less so that it will neither cause hydrolysis of boron trifluoride or tetrafluoroborate nor produce a hydrate of boron trifluoride or tetrafluoroborate as a by-product. The boron trifluoride gas comes into countercurrent contact with the organic solvent in the second absorption tower 5 so that it is dissolved in the organic solvent (the first step). The heat of absorption of boron trifluoride in the organic solvent is removed by the first cooler 4 and the second cooler 8 provided in the circulation line so that an appropriate operation temperature is maintained.

The organic solvent in which the boron trifluoride gas is dissolved is supplied to the second tank 6. A fluoride in an amount stoichiometrically equivalent to or less than the amount of the boron trifluoride is supplied to the second tank 6. As a result, the boron trifluoride reacts with the fluoride so that a tetrafluoroborate is produced (the second step). The reaction formula below shows the reaction of boron trifluoride and lithium fluoride.

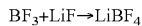

A tetrafluoroborate solution is produced in the second tank 6 and fed by the pump 7 to the top of the second absorption tower 5 through piping. The boron trifluoride supplied to the bottom of the tower is absorbed into the tetrafluoroborate solution in the second absorption tower (the third step). Subsequently, the reaction with the fluoride is continuously performed in the second tank 6 so that the tetrafluoroborate is concentrated to the desired concentration. In such circulation operation, when the desired concentration is reached, part of the solution from the pump 7 is withdrawn as a product. Simultaneously with the withdrawing of the product, the supply of an organic solvent from the outside to the first absorption tower 1 is started, and the pump 3 to which the liquid is supplied is changed from the first absorption tower 1 to the second absorption tower 5, when the tetrafluoroborate solution is continuously produced. In this process, while part of the absorption liquid is still circulated through the first absorption tower 1, the absorption liquid may be supplied to the second absorption tower 5 at the same time.

In order that the fluoride, which is hardly-soluble in an organic solvent, may be avoided from being in the form of a slurry, the fluoride supplied to the second tank 6 is preferably in an amount stoichiometrically equivalent to or less than the amount of the boron trifluoride dissolved in the organic solvent. This makes it possible to avoid clogging or the like caused by a fluoride slurry in the apparatus. The method of making the boron trifluoride stoichiometrically excess to the fluoride can be achieved by constantly supplying a stoichiometrically excess amount of the boron trifluoride to the fluoride. However, this method is not preferred, because the excess part of the boron trifluoride has to be discharged to the outside of the system in any step of the method so that raw material loss will occur. A more preferred method includes providing a liquid in which boron trifluoride has been previously absorbed in an excess amount suitable for operation and supplying, to the liquid, boron trifluoride and a fluoride in amounts stoichiometrically equivalent to each other.

The tetrafluoroborate solution, in which an excess of the boron trifluoride used in the second step is dissolved, is supplied to the top of the second absorption tower in the third step, and part of the tetrafluoroborate solution is also supplied to the degassing tower 9. The tetrafluoroborate solution fed to the degassing tower 9 is reduced in pressure by the air pump 12 so that the boron trifluoride is removed by distillation. Thus, a tetrafluoroborate solution containing the boron trifluoride and the fluoride in stoichiometrically equivalent amounts is prepared and withdrawn as a product from the third tank 10. Alternatively, the fluoride may be added in an amount stoichiometrically equivalent to the excess amount of the dissolved boron trifluoride to form the tetrafluoroborate solution. In view of continuous productivity, however, the excess part of the boron trifluoride is preferably removed by distillation under reduced pressure. A heater may also be placed in the degassing tower 9 to perform heating so that the efficiency of the removal of the boron trifluoride under reduced pressure can be increased.

The boron trifluoride removed by distillation is supplied to the bottom of the second absorption tower 5 by the air pump 12. The boron trifluoride is further brought into countercurrent contact with the organic solvent and/or the tetrafluoroborate solution in the second absorption tower 5 so that it is recovered and reused. When the boron trifluoride used as a raw material contains a small amount of hydrogen fluoride, the pressure of the tetrafluoroborate solution may be reduced by the air pump 12 so that the hydrogen fluoride can be removed by distillation, and then the hydrogen fluoride may be condensed in the condenser 13 and removed. The liquid (drain) condensed in the condenser 13, which contains the organic solvent, hydrogen fluoride, and boron trifluoride, may be directly subjected to disposal, or if necessary, the hydrogen fluoride, the boron trifluoride, or the organic solvent may be recovered and reused. The recovery may be performed using a conventional technique such as distillation or extraction.

In an embodiment of the invention, the tetrafluoroborate solution is circulated as described above so that a high-purity tetrafluoroborate can be continuously produced in high yield.

In an embodiment of the invention, an absorption tower is preferably used in view of industrial production efficiency, which, however, is not intended to exclude a surface absorption or bubbling method. Any tower type absorption apparatus such as a packed tower, a tray tower, or a wetted wall tower may be used as the first absorption tower 1 and the second absorption tower 5. The absorption may also be performed in any of a countercurrent mode and a co-current mode.

In the first step and the third step, the concentration of boron trifluoride in the organic solvent or the tetrafluoroborate solution is preferably 15% by weight or less, more preferably 10% by weight or less, in particular, preferably 5% by weight or less. If the concentration of boron trifluoride gas in the organic solvent is high, the organic solvent may react with the boron trifluoride so that discoloration, denaturation, or solidification of the organic solvent may occur. In addition, the heat of absorption may increase so that the liquid temperature may become difficult to control.

In the first step and the third step, the gas-liquid contact temperature between the boron fluoride gas and the organic solvent or the tetrafluoroborate solution is preferably from −40 to 100° C., more preferably from 0 to 60° C. If the gas-liquid contact temperature is less than −40° C., the organic solvent may be solidified so that continuous operation may be impossible. On the other hand, if the gas-liquid contact temperature is more than 100° C., the vapor pressure of boron trifluoride in the organic solvent or the tetrafluoroborate solution may be too high so that a problem such as a reduction in absorption efficiency or a reaction between the organic solvent and boron trifluoride may occur.

The organic solvent is preferably at least one of a non-aqueous organic solvent or a non-aqueous ionic liquid. The non-aqueous organic solvent is more preferably a non-aqueous aprotic organic solvent. Such an aprotic solvent has no ability to donate hydrogen ions, and therefore makes it possible to use, directly in an electrolyte for electrical storage devices such as lithium-ion secondary batteries, the tetrafluoroborate solution obtained by the production method of the invention.

Examples of the non-aqueous organic solvent include, but are not limited to, ethylene carbonate, propylene carbonate, butylene carbonate, vinylene carbonate, dimethyl carbonate, diethyl carbonate, methyl ethyl carbonate, methyl acetate, ethyl acetate, γ-butyl lactone, acetonitrile, dimethylformamide, 1,2-dimethoxyethane, methanol, and isopropanol. Among these organic solvents, solvents in which the resulting tetrafluoroborate is less likely to precipitate are preferred in view of continuous production, namely, solvents in which the tetrafluoroborate has high solubility are preferred, which include ethylene carbonate, propylene carbonate, dimethyl carbonate, diethyl carbonate, methyl ethyl carbonate, acetonitrile, and 1,2-dimethoxyethane. One or more of these non-aqueous organic solvents may be used alone or in any combination.

Examples of the non-aqueous aprotic organic solvent include a cyclic carbonate, a chain carbonate, a carboxylic acid ester, and a nitrile, an amide or ether compound. One or more of these non-aqueous aprotic organic solvents may be used alone or in any combination.

Examples of the non-aqueous ionic liquid include, but are not limited to, fluoride complex salts or fluoride salts of quaternary ammonium, quaternary phosphonium, or the like. In particular, examples of the quaternary ammonium cation include tetraalkyl ammonium cation, imidazolium cation, pyrazolium cation, pyridinium cation, triazolium cation, pyridazinium cation, thiazolium cation, oxazolium cation, pyrimidinium cation, and pyrazinium cation. Examples of the quaternary phosphonium cation include tetraalkyl phosphonium cation, etc. One or more of these non-aqueous ionic liquids may be used alone or in any combination, or may be used in the form of a solution in the non-aqueous organic solvent.

One or more of the non-aqueous organic solvents and the non-aqueous ionic liquids may be used alone or in any combination as the organic solvent.

The fluoride ($MF_n$, wherein M represents a metal or $NH_4$, and $1 \leq n \leq 3$) added in the second step may be not only LiF but also NaF, KF, RbF, CsF, $NH_4F$, AgF, $CaF_2$, $MgF_2$, $BaF_2$, $ZnF_2$, $CuF_2$, $PbF_2$, $AlF_3$, $FeF_3$, or the like. One or more of these fluorides may be used alone or in any combination.

The temperature of the reaction between the fluoride and the boron trifluoride gas is preferably from −50° C. to 200° C., more preferably from −10° C. to 100° C., in particular, preferably from 0° C. to 50° C. If it is less than −50° C., the organic solvent may be solidified, or the tetrafluoroborate may precipitate. If it is more than 200° C., the resulting tetrafluoroborate may decompose.

The resulting tetrafluoroborate solution may also be concentrated and/or cooled so that the tetrafluoroborate can be precipitated and separated from the solvent, which makes it possible to take out the tetrafluoroborate.

The resulting tetrafluoroborate solution may be directly used as an electrolyte for electrical storage devices, or a mixture of the resulting tetrafluoroborate solution with one or more of a non-aqueous aprotic organic solvent and a non-aqueous ionic liquid may be used.

The boron component-containing gas used in the production of the tetrafluoroborate, specifically, the boron trifluoride gas, is preferably absorbed into an absorption liquid so that it can be recovered and reused. Examples of the absorption liquid include water, an aqueous hydrofluoric acid solution, and a solution containing an M salt (wherein M is a carbonate, hydroxide, or halide containing at least one selected from the group consisting of Li, Na, K, Rb, Cs, $NH_4$, Ag, Mg, Ca, Ba, Fe, and Al). More specifically, the absorption liquid may be water or an aqueous hydrofluoric acid solution of 0 to 80% by weight, or water or an aqueous hydrofluoric acid solution of 0 to 80% by weight in which an M salt is dissolved (wherein M represents a carbonate, hydroxide, or halide containing at least one selected from the group consisting of Li, Na, K, Rb, Cs, $NH_4$, Ag, Mg, Ca, Ba, Fe, and Al). When absorbed in the absorption liquid, the boron trifluoride gas can be recovered in the form of $M(BF_4)_n$ (wherein $1 \leq n \leq 3$) and/or $H_aBF_b(OH)_c \cdot mH_2O$ (wherein $0 \leq a \leq 1$, $0 \leq b \leq 4$, $0 \leq c \leq 3$, $0 \leq m \leq 8$). This makes it possible to reduce the raw material loss even when an excess amount of $BF_3$ gas is used.

In the production of the tetrafluoroborate, as shown in FIG. 1, the boron trifluoride flowing out of the second absorption tower 5 is recovered in the first absorption tower 1 connected thereto in series. The boron trifluoride-containing organic solvent obtained in the first absorption tower 1 is supplied to the second absorption tower 5. When the boron trifluoride cannot be completely absorbed in the first absorption tower 1, the remaining boron trifluoride may be recovered and reused by the absorption method described above. This makes it possible to use the entire amount of boron trifluoride gas even when an excess amount of boron trifluoride is used, so that raw material loss can be reduced.

EXAMPLES

Hereinafter, preferred examples of the invention are illustratively described in detail. It will be understood that the materials, the amounts, and so on described in the examples and the comparative examples are illustrative only and are not intended to limit the scope of the invention, unless otherwise specified.

Example 1

This example was performed using the apparatus shown in FIG. 1. Commercially-available, battery-grade, diethyl carbonate (9 ppmw in water content) was added in an amount of 3 L to the first and second tanks 2 and 6, respectively, each made of fluororesin, and then the operation of circulation through each absorption tower and each tank was started using the pumps 3 and 7. At this time, the flow rates of the pumps 3 and 7 were both 1 L/minute. The first tank 2 and the second tank 6 were kept at a constant temperature of 20° C. using the first cooler 4 and the second cooler 8, respectively.

Subsequently, the supply of boron trifluoride gas to the bottom of the second absorption tower 5 was started at a rate of 3.41 g/minute. After the boron trifluoride gas was absorbed into the organic solvent for 2 minutes, the supply of lithium fluoride to the second tank 6 was started at a rate of 1.30 g/minute. Sixty minutes after the start of the supply of lithium fluoride, the product was withdrawn at a rate of 51.7 ml/minute. Simultaneously with the withdrawing of the product, the organic solvent was supplied at a rate of 50 ml/minute to the first absorption tower 1, and the liquid supply with the pump 3 was switched from the first absorption tower 1 to the second absorption tower 5, which was followed by continuous operation.

In the continuous operation for 60 minutes, 3,295.8 g of the solution was supplied to the degassing tower 9, and an excess of boron trifluoride gas dissolved in the solution was removed by distillation under the reduced pressure produced by the air pump 12. After the removal by distillation, 3,350 g of a lithium tetrafluoroborate solution was obtained by withdrawing from the third tank 10. The diethyl carbonate associated with the boron trifluoride gas removed by distillation was removed using the condenser 13. Subsequently, the boron trifluoride gas removed by distillation was merged with the raw material boron trifluoride gas and reused. The amount of the supply of the mixture of the raw material boron trifluoride gas and the boron trifluoride gas removed by distillation was kept at 3.41 g/minute.

The insoluble component content, the free acid content, and the water content of the diethyl carbonate solution of lithium tetrafluoroborate obtained in this way were 10 ppmw or less, 10 ppmw or less, and 10 ppmw or less, respectively. The pressure of the resulting diethyl carbonate solution of lithium tetrafluoroborate was further reduced at 40° C. so that a white solid was obtained by distillation removal of the diethyl carbonate. As a result of XRD analysis, the white solid was confirmed to be lithium tetrafluoroborate.

Example 2

Figure 2:
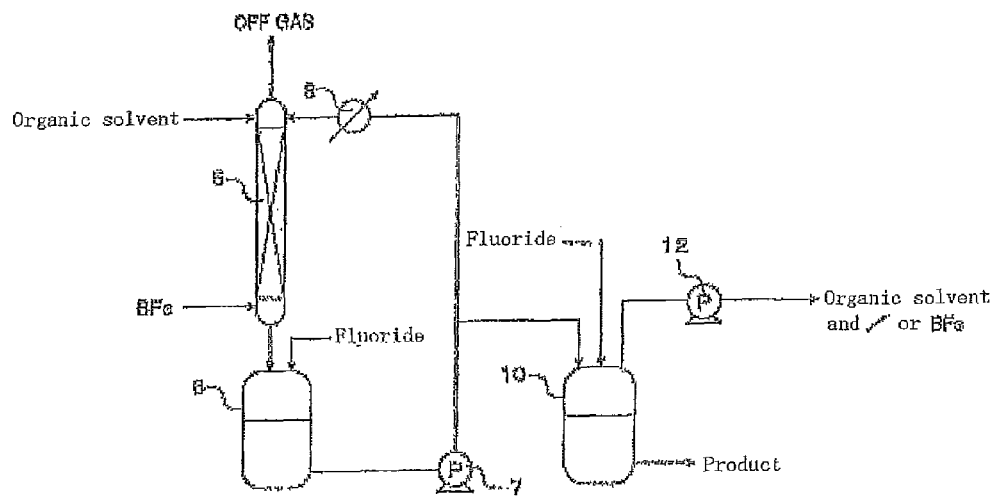
FIG. 2 is a schematic diagram for illustrating Examples 2 to 5 according to the invention.

This example was performed using the apparatus shown in FIG. 2. Commercially-available, battery-grade, diethyl carbonate (9 ppmw in water content) was added in an amount of 500 g to the second tank 6 made of fluororesin, and supplied to the top of the second absorption tower 5 and circulated by the pump 7. The second tank 6 was kept at a constant temperature of 20° C. using the cooler 8. Subsequently, boron trifluoride gas was supplied at a flow rate of 0.5 L/minute to the bottom of the second absorption tower 5 for 16.7 minutes, so that 22.6 g of boron trifluoride gas was introduced (the first step).

Subsequently, 8.0 g of lithium fluoride as the fluoride was gradually supplied to the second tank 6. The lithium fluoride quickly dissolved in the organic solvent containing the boron trifluoride and reacted with the boron trifluoride in the organic solvent. Thus, 530.6 g of a lithium tetrafluoroborate solution was obtained (the second step).

In addition, 500 g of diethyl carbonate was added to the second tank 6, and the same operation as described above was performed (the third step). A 275 g portion of the resulting lithium tetrafluoroborate solution was withdrawn to the third tank 10 and kept at a constant temperature of 20° C., and 0.335 g of lithium fluoride, which was stoichiometrically equivalent to the excess amount of dissolved boron trifluoride, was added.

The insoluble component content, the free acid content, and the water content of the diethyl carbonate solution of lithium tetrafluoroborate obtained in this way were 10 ppmw or less, 10 ppmw or less, and 10 ppmw or less, respectively. The pressure of the resulting diethyl carbonate solution of lithium tetrafluoroborate was further reduced at 40° C. by the air pump 12 so that a white solid was obtained by distillation removal of the diethyl carbonate. As a result of XRD analysis, the white solid was confirmed to be lithium tetrafluoroborate.

Example 3

This example was performed using the apparatus shown in FIG. 2. Commercially-available, battery-grade, diethyl carbonate (9 ppmw in water content) and ethylene carbonate (7 ppmw in water content) were added in amounts of 250 g and 250 g, respectively, to the second tank 6 made of fluororesin, and supplied to the top of the second absorption tower 5 and circulated by the pump 7. The second tank 6 was kept at a constant temperature of 20° C. using the cooler 8. Subsequently, boron trifluoride gas was supplied at a flow rate of 0.5 L/minute to the bottom of the second absorption tower 5 for 25.5 minutes, so that 34.6 g of boron trifluoride gas was introduced (the first step).

Subsequently, 13.0 g of lithium fluoride as the fluoride was gradually supplied to the second tank 6. The lithium fluoride quickly dissolved in the organic solvent containing the boron trifluoride and reacted with the boron trifluoride in the organic solvent. Thus, 457.6 g of a lithium tetrafluoroborate solution was obtained (the second step).

In addition, 250 g of diethyl carbonate and 250 g of ethylene carbonate were added to the second tank 6, and the same operation as described above was performed (the third step). A 275 g portion of the resulting lithium tetrafluoroborate solution was withdrawn to the third tank 10 and kept at a constant temperature of 20° C., and an excess of dissolved boron trifluoride was removed by distillation under the reduced pressure produced by the air pump 12. The insoluble component content, the free acid content, and the water content of the diethyl carbonate/ethyl carbonate solution of lithium tetrafluoroborate obtained in this way were 10 ppmw or less, 10 ppmw or less, and 10 ppmw or less, respectively.

Figure 3:
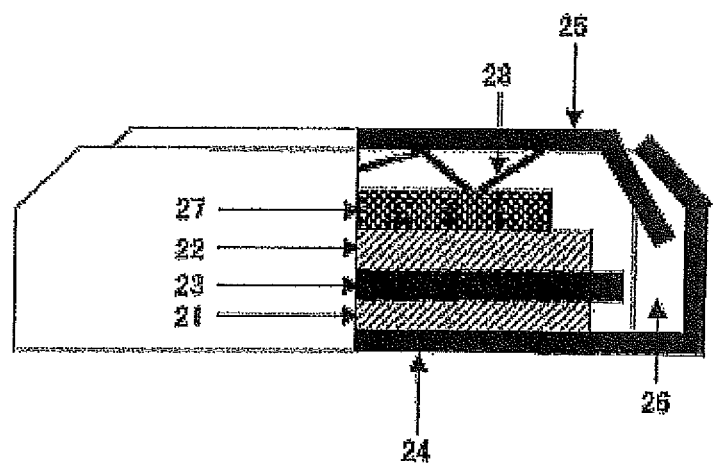
FIG. 3 is an explanatory diagram schematically showing the cross-section of a lithium secondary battery according to the invention.

Next, the solution obtained in this way was used to form a coin-type non-aqueous electrolyte lithium secondary battery as shown in FIG. 3, and then evaluated for its performance as an electrolyte by a charge/discharge test. Specifically, the procedures described below were performed.

<Preparation of Negative Electrode 22>

Natural graphite and polyvinylidene fluoride (PVdF) as a binding agent were mixed in a weight ratio of 9:1, and N-methylpyrrolidone was added to the mixture to form a paste. The paste was uniformly applied to a 22 μm thick copper foil using an applicator for electrode coating. The product was dried under vacuum at 120° C. for 8 hours and then formed into a negative electrode 22 with a diameter of 16 mm using an electrode punching machine.

<Preparation of Positive Electrode 21>

$LiCoO_2$ powder, acetylene black as a conduction aid, and PVdF as a binding agent were mixed in a weight ratio of 90:5:5, and N-methylpyrrolidone was added to the mixture to form a paste. The paste was uniformly applied to a 22 μm thick copper foil using an applicator for electrode coating. The product was dried under vacuum at 120° C. for 8 hours and then formed into a positive electrode 21 with a diameter of 16 mm using an electrode punching machine.

<Preparation of Coin-Type Non-Aqueous Electrolyte Lithium Secondary Battery>

The positive electrode 21 was placed on the bottom of a positive electrode case 24, and a porous polypropylene separator 23 was placed thereon. Subsequently, the non-aqueous electrolyte prepared in Example 2 was injected into the case, and a gasket 26 was inserted. Subsequently, the negative electrode 22, a spacer 27, a spring 28, and a negative electrode case 25 were sequentially placed on the separator 23, and the opening part of the positive electrode case 24 was sealed by inwardly folding it with a coin type battery caulking machine, so that a non-aqueous electrolyte lithium secondary battery was obtained. Subsequently, the battery was charged at a constant current of 0.4 mA, and when a voltage of 4.1 V was reached, the battery was charged at a constant voltage of 4.1 V for 1 hour. Discharging was performed at a constant current of 1.0 mA until a voltage of 3.0 V was reached. When a voltage of 3.0 V was reached, the voltage was kept at 3.0 V for 1 hour, and charge/discharge cycles were performed for a charge/discharge test. As a result, a charge/discharge efficiency of about 100% was obtained, and the charging capacity was not changed after 150 charge/discharge cycles.

Example 4

This example was performed using the apparatus shown in FIG. 2. Commercially-available dehydrated methanol (9 ppmw in water content) was added in an amount of 500 g to the second tank 6 made of fluororesin, and using the pump 7, the organic solvent was introduced into the top of the second absorption tower 5 and circulated. The second tank 6 was kept at a constant temperature of 20° C. using the cooler 8. Subsequently, boron trifluoride gas was supplied at a flow rate of 0.5 L/minute to the bottom of the second absorption tower 5 for 25.5 minutes, so that 34.6 g of boron trifluoride gas was introduced (the first step).

Subsequently, 13.0 g of lithium fluoride was gradually supplied to the second tank 6. The lithium fluoride quickly dissolved in the organic solvent containing the boron trifluoride and reacted with the boron trifluoride in the organic solvent. Thus, 457.6 g of a lithium tetrafluoroborate solution was obtained (the second step).

In addition, 500 g of methanol was added to the second tank 6, and the same operation as described above was performed (the third step). A 275 g portion of the resulting lithium tetrafluoroborate solution was withdrawn to the third tank 10 and kept at a constant temperature of 20° C., and an excess of dissolved boron trifluoride was removed by distillation under the reduced pressure produced by the air pump 12.

The insoluble component content, the free acid content, and the water content of the methanol solution of lithium tetrafluoroborate obtained in this way were 10 ppmw or less, 10 ppmw or less, and 10 ppmw or less, respectively.

Next, the resulting methanol solution of lithium tetrafluoroborate was kept at a constant temperature of 60° C., and the methanol was partially evaporated by nitrogen bubbling at 5 L/minute, so that a white solid was precipitated. The solution was subjected to filtration, and the methanol was purged from the resulting white solid with 5 L/minute of nitrogen at 60° C. As a result of XRD analysis, the resulting white solid was confirmed to be lithium tetrafluoroborate.

Example 5

This example was performed using the apparatus shown in FIG. 2. Commercially-available, battery-grade, diethyl carbonate containing water (550 ppmw in water content) was added in an amount of 500 g to the second tank 6 made of fluororesin, and supplied to the top of the second absorption tower 5 and circulated by the pump 7. The second tank 6 was kept at a constant temperature of 20° C. using the cooler 8. Subsequently, boron trifluoride gas was supplied at a flow rate of 0.5 L/minute to the bottom of the second absorption tower 5 for 17 minutes, so that 22.6 g of boron trifluoride gas was introduced (the first step).

Subsequently, 8.0 g of lithium fluoride as the fluoride was gradually supplied to the second tank 6. The lithium fluoride quickly dissolved in the organic solvent containing the boron trifluoride and reacted with the boron trifluoride in the organic solvent. Thus, 530.6 g of a lithium tetrafluoroborate solution was obtained (the second step).

In addition, 500 g of diethyl carbonate was added to the second tank 6, and the same operation as described above was performed (the third step). A 275 g portion of the resulting lithium tetrafluoroborate solution was withdrawn to the third tank 10 and kept at a constant temperature of 20° C., and an excess of dissolved boron trifluoride was removed by distillation under reduced pressure. The insoluble component content, the free acid content, and the water content of the diethyl carbonate solution of lithium tetrafluoroborate obtained in this way were 30 ppmw, 130 ppmw, and 400 ppmw, respectively. As in Example 3, this solution was used to form a coin-type non-aqueous electrolyte lithium secondary battery, and then evaluated for its performance as an electrolyte by a charge/discharge test. As a result, electrolysis of water was induced with the initial charge/discharge efficiency. The reduction in the charging capacity was able to be controlled to about 20% after 150 charge/discharge cycles. Slight expansion of the coin cell was observed after the 150 cycles.

Comparative Example 1

This comparative example was performed using the apparatus shown in FIG. 1. Commercially-available, battery-grade, diethyl carbonate (9 ppmw in water content) was added in an amount of 3 L to the first and second tanks 2 and 6, respectively, each made of fluororesin, and then the operation of circulation through each absorption tower and each tank was started using the pumps 3 and 7. At this time, the flow rates of the pumps 3 and 7 were both 1 L/minute. The first tank 2 and the second tank 6 were kept at a constant temperature of 20° C. using the first cooler 4 and the second cooler 8, respectively.

Subsequently, the supply of boron trifluoride to the bottom of the second absorption tower 5 was started at a rate of 3.41 g/minute. After the boron trifluoride gas was absorbed into the organic solvent for 2 minutes, the supply of lithium fluoride to the second tank 6 was started at a rate of 1.55 g/minute. Sixty minutes after the start of the supply of lithium fluoride, the second absorption tower 5 was clogged with lithium fluoride slurry so that the operation was made difficult.

DESCRIPTION OF REFERENCE CHARACTERS

1: First absorption tower
2: First tank
3, 7, 11: Pumps
4: First cooler
5: Second absorption tower
6: Second tank
8: Second cooler
9: Degassing tower
10: Third tank
12: Air pump
13: Condenser
21: Positive electrode
22: Negative electrode
23: Porous separator
24: Positive electrode case
25: Negative electrode case
26: Gasket
27: Spacer
28: Spring

The invention claimed is:

1. A method for producing a tetrafluoroborate, comprising:
a first step comprising dissolving boron trifluoride gas in an organic solvent at an absorption tower;
a second step comprising adding at a tank separate from the absorption tower, to the organic solvent from the absorption tower, a fluoride represented by $MF_n$ in an amount stoichiometrically equivalent to or less than the amount of the boron trifluoride so that a tetrafluoroborate solution is produced, M representing a metal or $NH_4$ and $1 \leq n \leq 3$; and
a third step comprising circulating a portion of the tetrafluoroborate solution back to the absorption tower from the tank so that the boron trifluoride gas is dissolved in the tetrafluoroborate solution.

2. The method for producing a tetrafluoroborate according to claim 1, wherein the organic solvent is at least one of a non-aqueous organic solvent or a non-aqueous ionic liquid.

3. The method for producing a tetrafluoroborate according to claim 1, wherein the organic solvent used has a water content of 100 ppmw or less.

4. The method for producing a tetrafluoroborate according to claim 1, wherein in the first step, the boron trifluoride gas is brought into gas-liquid contact with the organic solvent at a temperature of −40 to 100° C.

5. The method for producing a tetrafluoroborate according to claim 1, wherein in the third step, the boron trifluoride gas is brought into gas-liquid contact with the tetrafluoroborate solution at a temperature of −40 to 100° C.

6. The method for producing a tetrafluoroborate according to claim 1, wherein in the first step, the concentration of the boron trifluoride in the organic solvent is 15% by weight or less.

7. The method for producing a tetrafluoroborate according to claim 1, wherein in the third step, the concentration of the boron trifluoride in the tetrafluoroborate solution is 15% by weight or less.

* * * * *